US007763995B2

(12) United States Patent
Joshi et al.

(10) Patent No.: US 7,763,995 B2
(45) Date of Patent: Jul. 27, 2010

(54) INTELLIGENT, UNIVERSAL, RECONFIGURABLE ELECTROMECHANICAL INTERFACE FOR MODULAR SYSTEMS ASSEMBLY

(75) Inventors: Prakash B. Joshi, Andover, MA (US); Brian K. Decker, Andover, MA (US); John C. Magill, Andover, MA (US); Michael F. Hinds, Andover, MA (US)

(73) Assignee: Physical Sciences, Inc., Andover, MA (US)

( * ) Notice: Subject to any disclaimer, the term of this patent is extended or adjusted under 35 U.S.C. 154(b) by 301 days.

(21) Appl. No.: 12/053,263

(22) Filed: Mar. 21, 2008

(65) Prior Publication Data

US 2008/0233768 A1 Sep. 25, 2008

Related U.S. Application Data

(60) Provisional application No. 60/919,302, filed on Mar. 21, 2007.

(51) Int. Cl.

*H01B 7/30* (2006.01)
*H01B 11/02* (2006.01)
*H02B 1/20* (2006.01)
*H02G 5/06* (2006.01)

(52) U.S. Cl. ...................................................... 307/147

(58) Field of Classification Search ................. 307/147; 439/43, 49, 248

See application file for complete search history.

(56) References Cited

U.S. PATENT DOCUMENTS

| | | | |
|---|---|---|---|
| 4,976,399 | A | 12/1990 | Bay et al. |
| 6,330,093 | B1 | 12/2001 | Eller et al. |
| 7,371,091 | B2 | 5/2008 | Kojori |
| 7,402,897 | B2 | 7/2008 | Leedy |
| 7,405,497 | B2 | 7/2008 | Jacobs et al. |

*Primary Examiner*—Albert W Paladini
*Assistant Examiner*—Carlos Amaya
(74) *Attorney, Agent, or Firm*—Proskauer Rose LLP

(57) ABSTRACT

An electromechanical connection includes a first conductor disposed in a first non-conductive array and a second conductor disposed in a second non-conductive array capable of mating with the first non-conductive array. The second conductor is capable of mating with the first conductor when the first non-conductive array and the second non-conductive array are mated. A processor associated with the first non-conductive array determines if an electrical connection is formed between the first conductor and the second conductor. The processor can assign a function to the electrical connection.

26 Claims, 13 Drawing Sheets

INTELLIGENT, UNIVERSAL, RECONFIGURABLE ELECTROMECHANICAL INTERFACE FOR MODULAR SYSTEMS ASSEMBLY

CROSS REFERENCE TO RELATED APPLICATION

This application claims the benefit of and priority to U.S. Provisional Patent Application No. 60/919,302, filed Mar. 21, 2007, the entire disclosure of which is incorporated herein by reference.

GOVERNMENT RIGHTS

The invention was made with funding provided by the National Aeronautics and Space Administration, contract number NNM05AA12C. The federal government may have rights in the invention.

FIELD OF THE INVENTION

The invention relates generally to a method and apparatus for forming an electromechanical interface for a modular assembly. In one embodiment, the invention relates to an electromechanical interface for a modular assembly of electronic systems.

BACKGROUND OF THE INVENTION

Electrical and mechanical connections between systems can require bulky cables and mounting hardware to ensure reliable connectivity. The cables and hardware can add weight to a device and use valuable space, which can otherwise be eliminated making devices more compact. Conventional electrical and mechanical systems require proper alignment and positioning of mating systems. For automated assembly of systems in space, precise alignments, angular orientations, and relative positioning of mating systems is necessary. This results in space systems that are heavy, bulky and complex.

SUMMARY OF THE INVENTION

The invention, in one embodiment, features a method and apparatus for forming an electromechanical connection between two or more systems. The connection system can be referred to as AUTOCONNECT (AUTO-configuring electromechanical interCONNECT). In one embodiment, AUTOCONNECT can be used to form electromechanical interfaces in a modular assembly. AUTOCONNECT can be used in any system that requires an electrical connection. Exemplary systems in which an electromechanical connection or an interface (e.g., AUTOCONNECT) can be used include, but are not limited to, computers, radios, televisions, cameras, lighting systems, vehicles, automobiles, spacecraft, and space systems. AUTOCONNECT can reduce the need for or eliminate the need for cables, connectors, mechanical fasteners, and mounting hardware in these, and other, systems. These and other advantages can lead to a significant reduction in weight, less complex devices (no cables to route), reduced integration time and effort (hence lower cost), avoidance of reliability issues associated with cables and connectors, and the flexibility to distribute modules to achieve the desired mass properties.

An electromechanical connection (e.g., AUTOCONNECT) can be used as an electromechanical fastener that provides mechanical attachment and enables transfer of electrical power, data, and/or signals across mating surfaces of systems. The transfer can occur irrespective of the relative orientation of the two adjoining surfaces. For example, unlike a conventional electrical plug, a first prong need not be predesignated as a "hot" prong and a second prong as a "neutral" prong. Using AUTOCONNECT, for example, after a plurality of electrical connections is formed, AUTOCONNECT can designate at least one connection to serve as a "hot" connection and at least one connection to serve as a "neutral" connection. More generally, AUTOCONNECT can assign many electrical connections to different functions, such as power, ground, serial data, analog signals, and other similar functions. An advantage of AUTOCONNECT is that precise alignments, angular orientation, and relative positioning of mating systems is not needed in the assembly of systems on the ground or in autonomous assembly of space systems in orbit.

In one embodiment, an electromechanical interface (e.g., AUTOCONNECT) can be used for assembly of spacecraft on the ground from subsystems and payload modules, resulting in reduction in integration and test time up to an order-of-magnitude compared to current state-of-the art (e.g., several days compared to several months). AUTOCONNECT makes it possible to rapidly assemble, integrate, and test small spacecraft or microsatellites in the field, e.g., to facilitate quick launch of a spacecraft.

In one aspect, the invention features a method of forming an electromechanical connection. The method includes providing a first plurality of conductors disposed in a first non-conductive array. In certain embodiments, the non-conductor can be an insulator. Each conductor is electrically insulated from an adjacent conductor of the first plurality of conductors. A second plurality of conductors is disposed in a second non-conductive array. Each conductor of the second plurality of conductors is electrically insulated from an adjacent conductor of the second plurality of conductors. The first non-conductive array and the second non-conductive array engage to form a plurality of discrete electrical connections between at least a portion of the first plurality of conductors and at least a portion of the second plurality of conductors. Each discrete electrical connection is formed by a single conductor of the first plurality of conductors and a single conductor of the second plurality of conductors. The number of discrete electrical connections can be determined, and one or more of the discrete electrical connections can be assigned a function to serve.

In another aspect, the invention features an electromechanical connection that includes a first conductor disposed in a first non-conductive array. A second conductor is disposed in a second non-conductive array capable of mating with the first non-conductive array. The second conductor is capable of mating with the first conductor when the first non-conductive array and the second non-conductive array are mated. A processor associated with the first non-conductive array determines if an electrical connection is formed between the first conductor and the second conductor when the first non-conductive array and the second non-conductive array are mated. The processor also assigns a function to the electrical connection.

In still another aspect, the invention features a substrate for forming an electromechanical connection. The substrate includes a conductor disposed in an array of non-conductors, and a switch in electrical communication with the conductor. Each channel of the switch is associated with a predetermined function. A processor is used to determine if the conductor has formed an electrical connection, and the processor assigns a predetermined function to the electrical connection. The processor also triggers the switch to form a path for electrical communication between the conductor and a source of the predetermined function.

In yet another aspect, the invention features an electromechanical connection including a first plurality of conductors disposed in a first non-conductive array and a second plurality of conductors disposed in a second non-conductive array capable of mating with the first non-conductive array. Each conductor of the first plurality of conductors is electrically insulated from an adjacent conductor of the first plurality of conductors. Each conductor of the second plurality of conductors is electrically insulated from an adjacent conductor of the second plurality of conductors. The first plurality of conductors is capable of mating with the second plurality of conductors to form a plurality of electrical connections when the first non-conductive array and the second non-conductive array are mated. A processor associated with the first non-conductive array determines the number of electrical connections formed and assigns one or more of the electrical connections to serve a predetermined function.

In another aspect, the invention features a spacecraft capable of being assembled in orbit. For example, two or more spacecraft modules can be assembled. Each spacecraft module can include one or more electromechanical connections.

In other examples, any of the aspects above, or any apparatus or method described herein, can include one or more of the following features. In various embodiments, each conductor of the first plurality of conductors is associated with a switch comprising a plurality of channels. Each channel of each switch is associated with a predetermined function of a set of predetermined functions. In some embodiments, the function is one of the set of predetermined functions. A discrete electrical connection can be selected, and the switch associated with the conductor of the first plurality of conductors can be triggered to form a path for electrical communication between the electrical connection and a source of the predetermined function.

In various embodiments, the switches associated with the first plurality of conductors can be cycled to identify the number of discrete electrical connections formed. A portion of the discrete electrical connections can be assigned to serve one of the predetermined functions of the set of predetermined functions. In some embodiments, a module associated with the second non-conductive array communicates to a processor associated with the first non-conductive array requirements for each predetermined function of the set of predetermined functions. Each predetermined function can be assigned to a portion of the discrete electrical connections, where no discrete electrical connection serves more than one function.

In various embodiments, AUTOCONNECT fastening systems can rely on a re-closeable fastener. For example, both linear devices like zippers and interlocking area array connections such as loop and hook connectors offered by DuPont (Wilmington, Del.), Velcro USA (Manchester, N.H.), and the 3M Company (St. Paul, Minn.), among others, or dual lock mushroom connection system, such as 3M's dual-lock products, can be used.

In various embodiments, each non-conductor can be a hook type connector or a loop type connector of a hook and loop connection system. In one embodiment, each non-conductor of the first non-conductor array is a hook type connector, and each non-conductor of the second non-conductive array is a loop type connector. In some embodiments, each non-conductor of the first non-conductive array is a loop type connector, and each non-conductor of the second non-conductive array is a hook type connector. In some embodiments, each non-conductor can be a mushroom type connector of a dual lock mushroom connection system.

A conductor can be formed by metallizing a hook type connector or a loop type connector of a hook and loop connection system. In an embodiment where a non-conductive array is formed from hook type connectors, each conductor associated with that non-conductive array can be formed by metallizing a hook type connector. In an embodiment where a non-conductive array is formed from loop type connectors, each conductor associated with that non-conductive array can be formed by metallizing a loop type connector. In some embodiments, a conductor can be formed by metallizing a mushroom type connector of a dual lock mushroom connection system. In various embodiments, a conductive polymer or conductive non-metal material is used to make a non-conductor conductive.

In some embodiments, a conductor can be a conductive element disposed between adjacent fasteners (e.g., hooks, loops, or mushrooms). For example, a conductive pin can be inserted into the substrate forming the hook and loop connection system or the mushroom connection system. The pin can be any suitable conductive material, such as silver, copper, gold, or brass. The pin can be affixed to the substrate or can be soldered to a flexible circuit backing the substrate. The conductor can include a plurality of embedded discrete electrically conducting components (e.g., a pin or metallic studs).

In various embodiments, a module associated with the second non-conductive array communicates to the processor associated with the first non-conductive array requirements for each predetermined function of a set of predetermined functions. The processor can assign each predetermined function a portion of the discrete electrical connections. In one embodiment, no discrete electrical connection serves more than one function. The processor can assign a plurality of electrical connections to serve one of the predetermined functions of the set of predetermined functions.

Advantages of an electromechanical connection (e.g., the AUTOCONNECT system) can include a plug-and-play interface that simultaneously provides standardized mechanical and electrical connections between two autonomous modules, e.g., spacecraft subsystems, spacecraft modules, or a spacecraft itself. The electromechanical connection can include intelligence to automatically configure the electrical connections between mating systems using standardized interface software without requiring time-consuming manual pin-out checks and cumbersome documentation. The electromechanical connection can be universal allowing for electromechanical integration without regard to the relative orientation and location of an attaching module relative to a spacecraft deck and/or pane. The electromechanical connection can incorporate numerous redundant electrical connections and continuously checks for the presence of "good" contacts, making the system inherently robust by discarding faulty connections and reconfiguring their functions using good connections.

Some advantages of AUTOCONNECT for spacecraft subsystems and payload modules include that AUTOCONNECT-covered surfaces can be rapidly assembled onto spacecraft decks or panels also equipped with AUTOCONNECT on their surfaces, while simultaneously keeping within spacecraft mass constraints. Any subsystem or payload module can be mounted anywhere on a spacecraft panel. Furthermore, modules can be mounted interchangeably. A sensor or subsystem specific to a particular space mission can be assembled in the field within minutes. AUTOCONNECT provides functional reconfigurability and mission-adaptive flexibility. AUTOCONNECT's reconfigurability yields a high level of robustness and reliability of electrical connections as a spacecraft encounters thermal cycles and inertial forces on-orbit.

An electromechanical connection can be formed without the need for cables and/or connectors. Furthermore, AUTOCONNECT can provide secure and robust mechanical attachment between spacecraft decks and panel modules and/or subsystem and payload modules without the need for mounting brackets and hardware. The reduction or elimination of mounting hardware, cables and harnesses, and electrical connectors and strain reliefs can achieve approximately 15% mass savings for a spacecraft system. A significant volume savings is achieved as "dead zones" that result from bulky electrical connectors and strain reliefs around subsystem and payload boxes can be reduced or eliminated. For example, an approximately 15% volume reduction can be achieved. Further, a significantly simpler spacecraft assembly process with reduced complexity and greater reliability is achieved. The reduction or elimination of the need for manual electrical/mechanical checkouts and associated interface documentation during assembly can mean significantly simpler and/or faster spacecraft integration and test processes requiring less labor and resulting in substantial cost savings. An estimated factor of 10 reduction in the time needed to assemble and/or integrate a spacecraft can be realized.

Other aspects and advantages of the invention will become apparent from the following drawings, detailed description, and claims, all of which illustrate the principles of the invention, by way of example only.

BRIEF DESCRIPTION OF THE DRAWINGS

The advantages of the invention described above, together with further advantages, can be better understood by referring to the following description taken in conjunction with the accompanying drawings. The drawings are not necessarily to scale, emphasis instead generally being placed upon illustrating the principles of the invention.

DESCRIPTION OF THE INVENTION

Figure 1A:
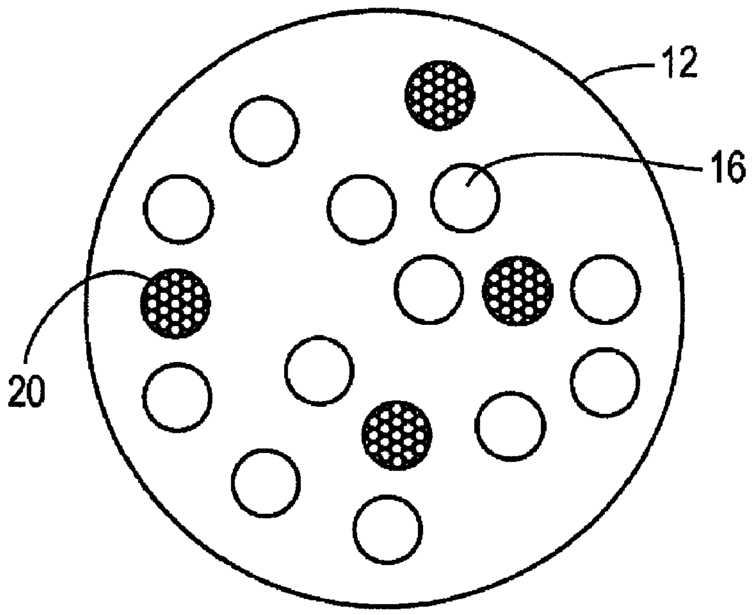
FIG. 1A shows a substrate for forming a reconfigurable electromechanical connection interface.
Figure 1B:
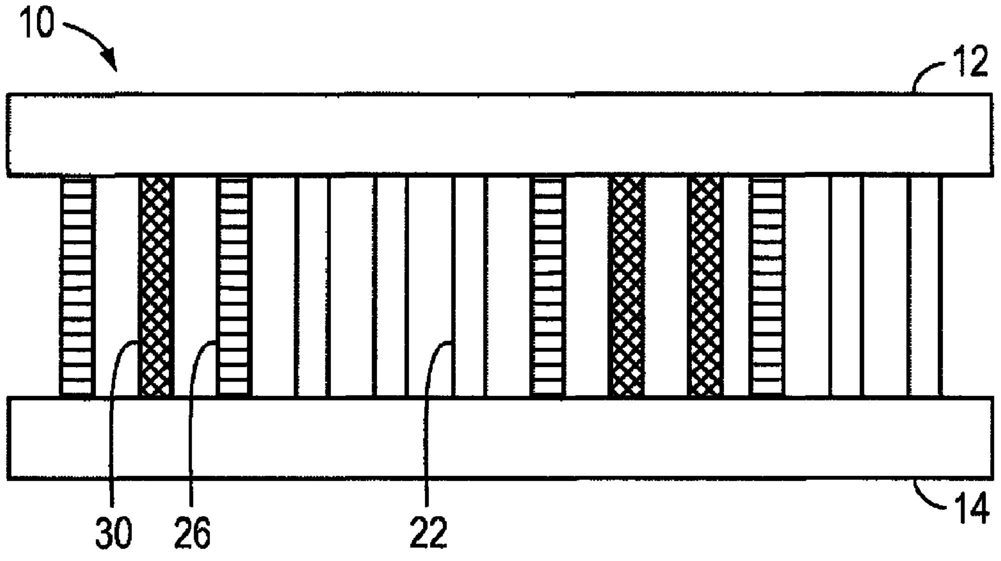
FIG. 1B shows a cross sectional view of a reconfigurable electromechanical connection interface.

FIG. 1A shows a first substrate 12 for forming a reconfigurable electromechanical connection. The first substrate 12 includes a non-conductive array of elements 16 and one or more conductive regions 20. FIG. 1B shows a cross sectional view of reconfigurable electromechanical connection interface 10 between a first substrate 12 and a second substrate 14. The first substrate 12 and/or the second substrate 14 can take a variety of shapes. Suitable shapes include but are not limited to a square, circle, polygon, triangle, parallelogram, quadrilateral, hexagon, or octagon.

When the first substrate 12 and the second substrate 14 are mated, non-conductive array of elements 16 and conductive regions 20 can overlap. If a non-conductive array of element 16 of the first substrate 12 overlaps with a non-conductive array of the second substrate 14, a non-conductive connection 22 is formed. If a non-conductive array of element 16 of the first substrate 12 (or the second substrate 14) overlaps with a conductive region 20 of the second substrate 14 (or the first substrate 12, respectively), a non-conductive connection 26 is formed. If a conductive region 20 of the first substrate 12 overlaps with a conductive region 20 of the second substrate 14, an electrical connection 30 is formed.

The conductive regions 20 can be conductive metalized pins or connectors. Mating the first substrate 12 and the second substrate 14 can cause non-conductive array of elements 16 and/or conductive regions 20 of both substrates to be mechanically fastened. Embedding the conductive regions 20 in the non-conductive array of elements 16 can prevent shorting because the conductive regions 20 are isolated from adjacent conductive regions 20 while being mechanically fastened and electrically connected.

Electrical connections 30 can be configured for a particular function, e.g., power, ground, data or signal. These functions can be auto-configured one or multiple times. Once the electrical connections 30 are configured, a single electrical connection can fail. For example, the electrical connection can open due to an increase in temperature or vibration. In the event of an electrical connection failure, one, a subset, or all of the electrical connections 30 can be reconfigured. The function configured to the failed electrical connection can be assigned to a different electrical connection.

Figure 2A:
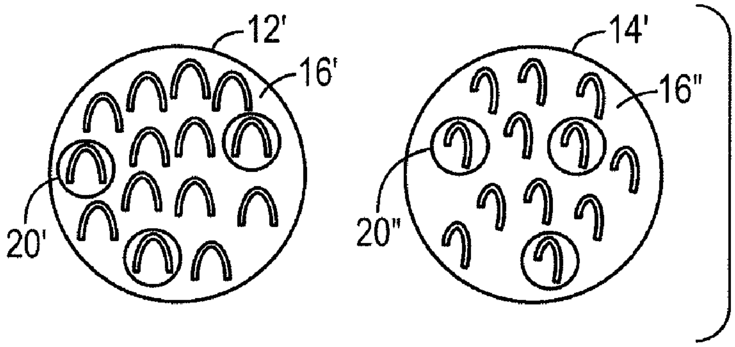
FIG. 2A shows substrates for forming a reconfigurable electromechanical connection interface.

FIG. 2A shows substrates for forming reconfigurable electromechanical connection interface 10'. The first substrate 12' includes a non-conductive array of loops 16', one or more conductive loop regions 20', and electrical connectors 24'. The second substrate 14' includes a non-conductive array of hooks 16", one or more conductive hook regions 20", and electrical connectors 24". Each conductive loop regions 20' can be one loop or a group of loops. Each conductive hook region 20" can be one hook or a group of hooks.

Figure 2B:
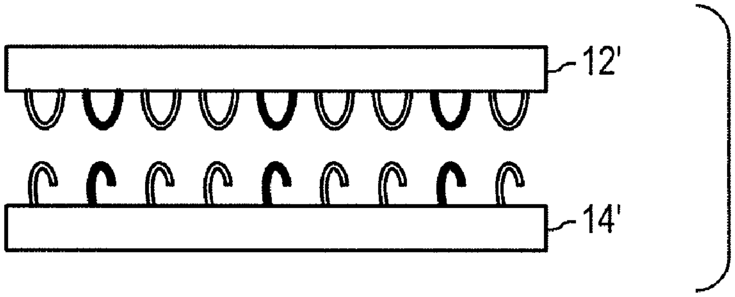
FIG. 2B shows a cross sectional view of substrates for forming a reconfigurable electromechanical connection interface.
Figure 2C:
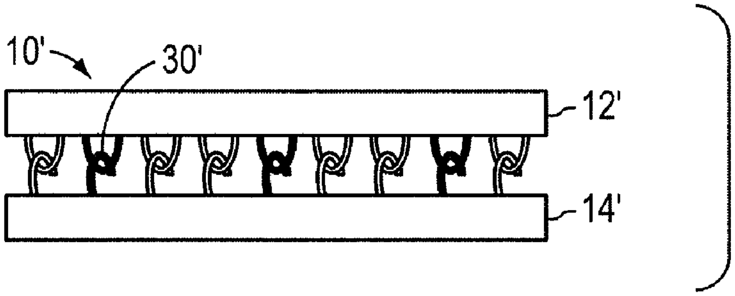
FIG. 2C shows a cross sectional view of a reconfigurable electromechanical connection interface.

FIG. 2B shows a cross sectional view of the first substrate 12' and the second substrate 14' prior to mating to form a reconfigurable electromechanical connection interface 10'. Electrical connections 30' can be formed when a conductive loop 20' overlaps with a conductive hook 20", as shown in FIG. 2C. The loop and hook can be mechanically fastened.

Figure 2D:
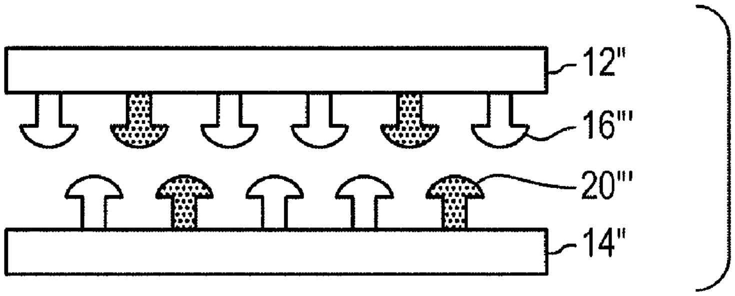
FIG. 2D shows substrates for forming a reconfigurable electromechanical connection interface.
Figure 2E:
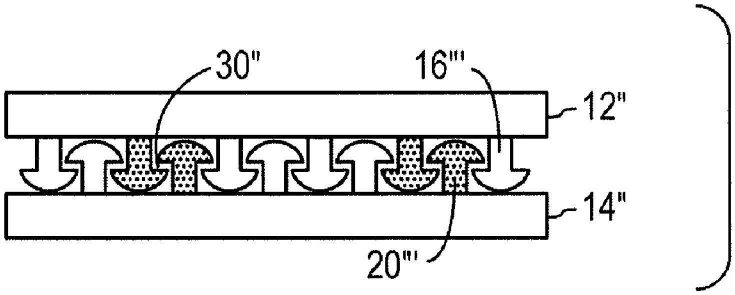
FIG. 2E shows a cross sectional view of a reconfigurable electromechanical connection interface.

FIGS. 2D and 2E show cross sectional views of substrates including mushroom-type connectors. The first substrate 12" and the second substrate 14" can be used to form a reconfigurable electromechanical connection interface 10". Each of the first substrate 12" and the second substrate 14" include a non-conductive array of mushrooms 16'" and one or more conductive mushroom regions 20'". Electrical connections 30" can be formed when a conductive mushroom 20'" of the first substrate 12" overlaps with a conductive mushroom 20'" of the second substrate 14", as shown in FIG. 2E. The conductive mushrooms 20'" can be mechanically interconnected. Each conductive mushroom region 20'" can be one mushroom or a group of mushrooms.

When the first substrate 12" and the second substrate 14" are mechanically fastened, each mushroom can connect in at least two places (e.g., around the periphery or the underside of the mushroom top), enabling the interface 10" to carry a greater load than a hook and loop interconnection.

Conductive regions or elements (e.g., hooks, loops, and mushrooms) can be made conductive by metallization. Metalized regions can be metalized by electroplating or by incorporating metallic studs. Metalized regions can be selectively metalized to introduce a distribution of electrical connections according to a prescribed pattern and desired areal density.

Mechanical fastening can occur by using dual-interlocking interconnects available commercially from the 3M Company. 3M Company products can provide mechanical fasteners with varied levels of a detachment force (e.g., the peel or tension force needed to detach two dual-interlocking surfaces) that is dependant on the mechanical fasteners, e.g., mushrooms, areal density, and the like. For example, for operating in a temperature range of about −56° C. to about 93° C., a first substrate with about 170 Polyolefin mushrooms per square inch attached to a second substrate with about 400 Polyolefin mushrooms per square inch can have a detachment force of about 32 psi. While a first substrate with about 250 Polyolefin mushrooms per square inch attached to the same second substrate with about 400 Polyolefin mushrooms per square inch can have a detachment force of about 73 psi. The dual-interlocking interconnects can provide a stronger connection than hook-and-loop interconnects. For example, the detachment force for the dual-interlocking interconnects is approximately double the attachment force for the hook and loop type interconnects. Once pressed together and attached, the dual-interlocking interconnects provide a very strong bond. A peel strength of approximately 10 lb/in is within a range that allows a reconfigurable electromagnetic connection interface to detach when necessary during assembly and integration.

Mechanical fastening can occur by using Velcro type interconnects that can be appropriate for assembly of systems in orbit. Dual-lock interconnects (e.g., mushroom type interconnects) can be more appropriate for assembly of a system on the ground. As indicated above, dual-lock interconnects can resist a larger detachment force, e.g., the detachment force associated with launch of a spacecraft, whereas Velcro type interconnects are sufficient to resist a smaller detachment force, e.g., the detachment force associated with orbit of a spacecraft.

Non-conductive arrays of element 16 can be a polyolefin material or a Teflon material. Polyolefin materials can be used for a temperature range of approximately −55° C. to >90° C. Because atomic oxygen that is present in low earth orbit (e.g., orbit below ~500 km) can damage polyolefin material for a long duration mission life, a Teflon material can be used. Teflon can be used at temperatures >150° C. Conductive regions 20 can be coated with a thin layer of silicon dioxide for protection against atomic oxygen, e.g., a layer on the order of microns.

Figure 3A:
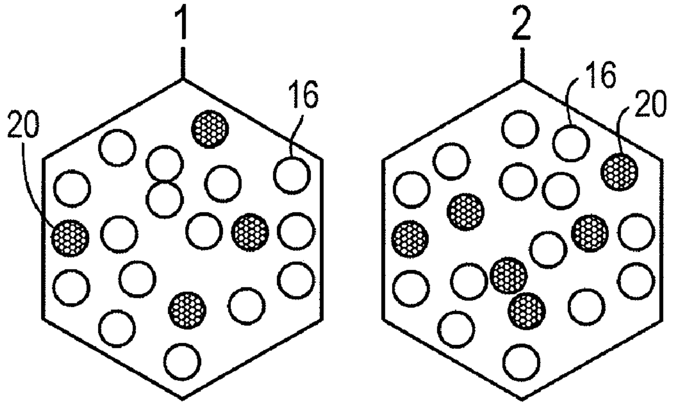
FIG. 3A shows hexagonal substrates for forming a reconfigurable electromechanical connection interface.

FIG. 3A shows two substrates, a hexagonal shaped first substrate 12 and a hexagonal shaped second substrate 14, for forming a reconfigurable electromechanical interface. Depending on the overlap orientation of first substrate 12 and second substrate 14, a varying number of electrical connections 30 can be formed at various positions on the connected substrates.

Figure 3B:
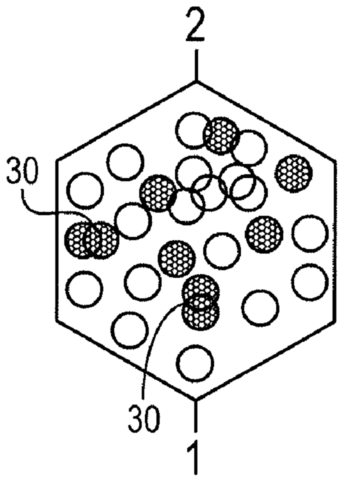
FIG. 3B shows a reconfigurable electromechanical connection interface formed from overlapping hexagonal substrates.

FIG. 3B shows the first substrate 12 and the second substrate 14 at an angle of 180° with respect to the first substrate 12. First substrate 12 and second substrate 14 have a substantial areal overlap. As illustrated in FIG. 3B, some of the conductive regions 20 of the first substrate 12 overlap with some of the conductive regions 20 of the second substrate 14 creating electrical connections 30.

The second substrate 14 can overlap with the first substrate 12 at any angle between 0° and 360°. In some embodiments, the first substrate 12 can interconnect with the second substrate 14 at an angle of 270° with respect to the first substrate 12, with substantial areal overlap. In certain embodiments, the first substrate 12 can interconnect with the second substrate 14 at an angle of 0° with respect to the first substrate 12, with a partial areal overlap, which can result in a reduced number of electrical connections 30. As the areal density of conductors decreases, the size of the contact area needed to maintain a minimum number of electrical connections to form an electromechanical connection becomes larger.

Figure 3C:
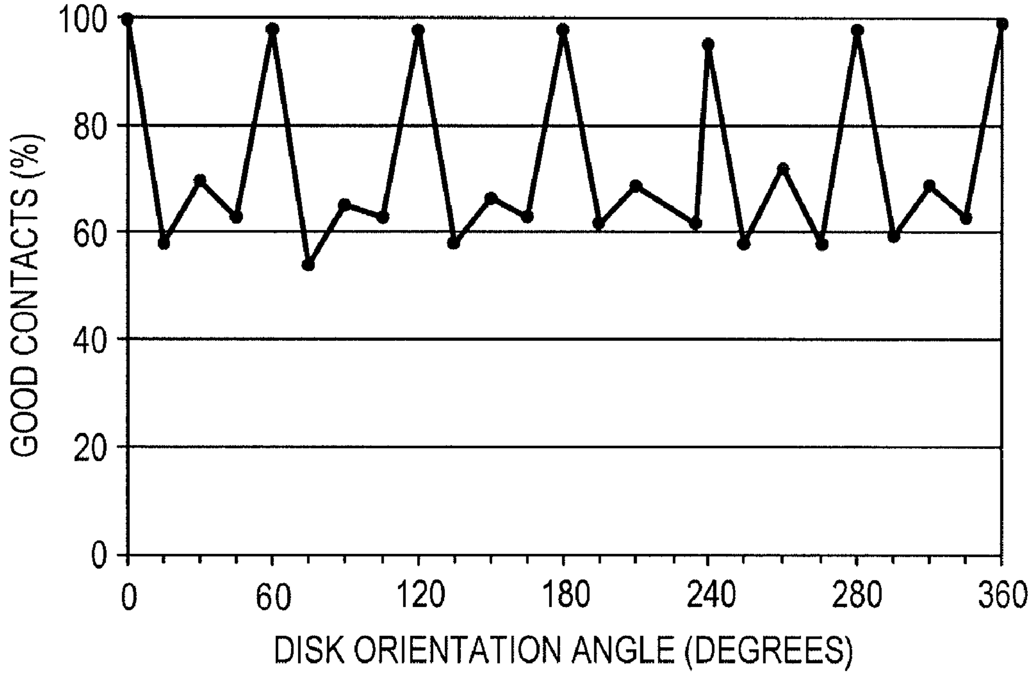
FIG. 3C shows a plot of a percentage of good contacts versus an angular orientation for a connected hexagonal reconfigurable electromechanical connection interface formed from hexagonal substrates.

FIG. 3C shows a plot of a percentage of good contacts versus an angular orientation between two hexagonal reconfigurable electromechanical interface surfaces, e.g., two disks simulating AUTOCONNECT, with 64 conductors on each disk. The data was obtained by using a breadboard simulator as is described in further detail below in connection with FIG. 7. The plot shows a periodicity at 60 degrees that is due to the hexagonal conductor (e.g., conductive regions 20) pattern. The 60 degree periodicity can be avoided, if necessary, by using other conductor distribution patterns. Greater than 60% good contacts can be achieved and sufficient a number of conductors can be available for function buses. Conductor patterns can be non-hexagonal arrays or complex patterns.

Figure 4A:
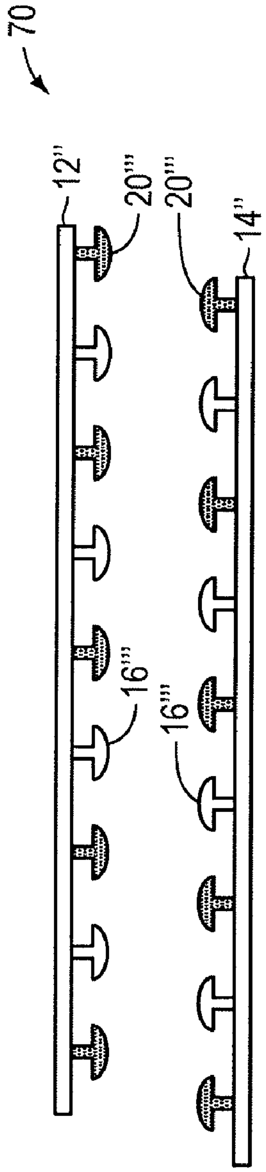
FIG. 4A shows substrates for forming a reconfigurable electromechanical connection interface.
Figure 4B:
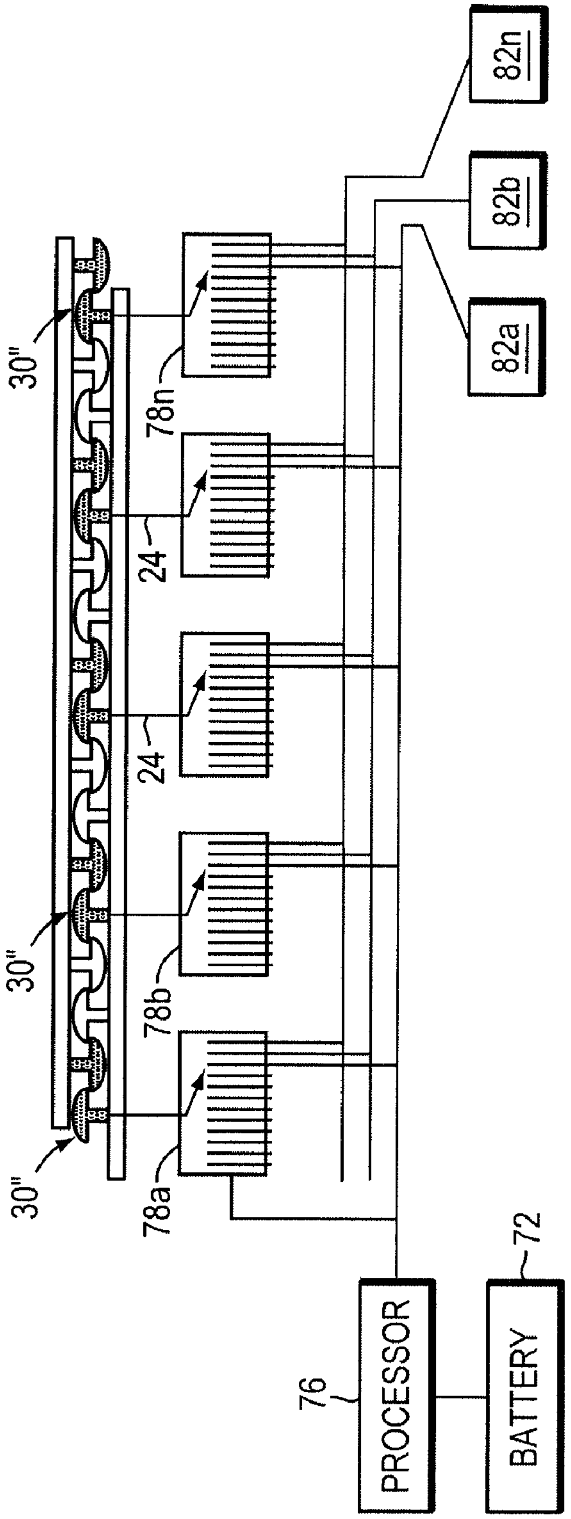
FIG. 4B shows a reconfigurable electromechanical connection interface.

FIG. 4A shows an example of a reconfigurable electromechanical interface 70 including first substrate 12" and second substrate 14" prior to mating. First substrate 12" and second substrate 14" each include an array of non-conductive mushrooms 16'" and conductive mushrooms 20'". FIG. 4B shows an example of a reconfigurable electromechanical interface 70 after the first substrate 12" and the second substrate 14" have been mated.

Electrical connections 30 are formed when a conductive mushroom 20'" of the first substrate 12" connects with a conductive mushroom 20'" of the second substrate 14". Conductive mushrooms 20'" of the second substrate 14" include electrical connectors 24 each connected to one or more switches 78*a*, 78*b* . . . 78*n* (generally, 78), one or more function buses 82*a*, 82*b* . . . 82*n* (generally, 82), an interface processor 76 powered by a battery 72.

The interface processor 76 can sequentially and/or continuously cycle through each switch 78 to identify which conductive mushrooms 20'" of the second substrate 14" formed electrical connections 30 with the conductive mushrooms 20'" of the first substrate 12". Once the interface processor 76 has identified the successfully formed electrical connections 30, the interface processor 76 can close appropriate switches 78 to reconfigure the electrical connections 24 to connect to one or more function buses 82*a*, 82*b* . . . 82*n*.

The interface processor 76 can be in communication with an attaching module. The attaching module can include a communications bus and a function bus. The attaching module can be powered by a core module (e.g., a spacecraft) after establishing communication with the core module over the communications bus. The attaching module can identify itself by specifying the attaching module's power, ground, and digital and/or analog data lines requirements to the core module. The interface processor 76 can then allocate a sufficient number of electrical connections to meet these needs.

A combination of hardware and software can be used to identify electrical connections between two reconfigurable electromechanical interface substrates and to assign specific functions to the electrical connections. Reconfigurable electromechanical interface can be a self-configuring electrical connector.

Figure 5C:
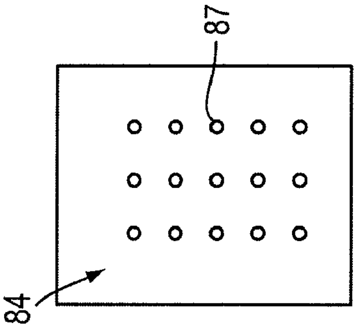
FIG. 5C shows a sectional view of an electromechanical connection decal capable of interfacing with a PGA.
Figure 5B:
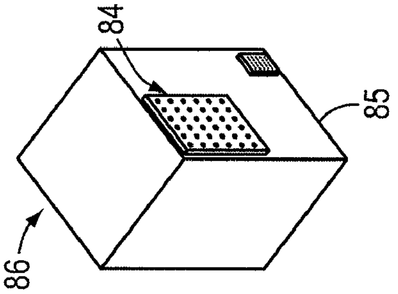
FIG. 5B shows an exploded view of the PGA.
Figure 5A:
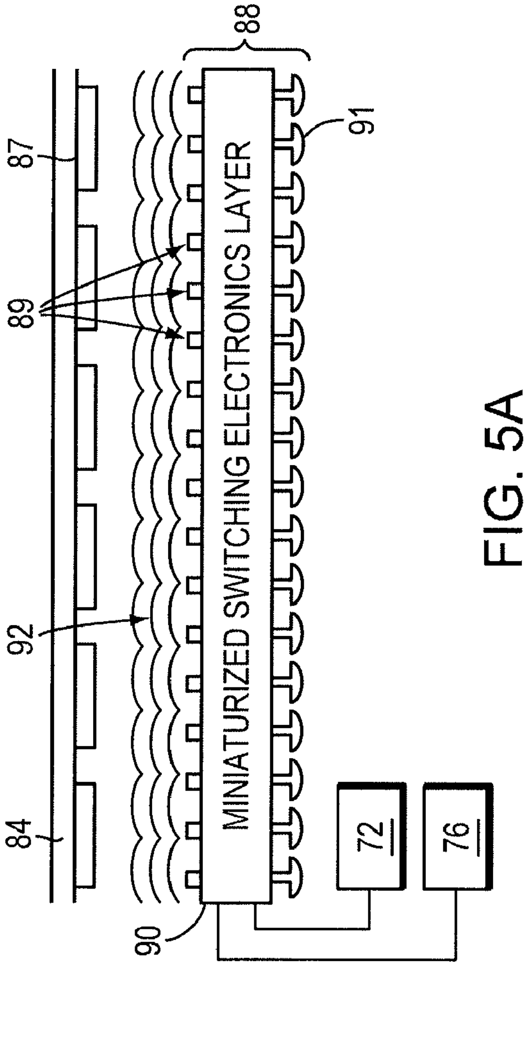
FIG. 5A shows a perspective view of a Pad Grid Array (PGA) on a subsystem surface.

FIG. 5A shows PGA 84 on a surface 85 of a subsystem 86. FIG. 5B shows an exploded view of the PGA 84, which includes connectors 87. FIG. 5C shows an electromechanical connection decal 88 capable of interfacing with a PGA 84 on a subsystem surface.

The decal 88 can include a PGA 89 on a back surface, a distribution of micro-switches 90, and mechanical interconnects 91 for forming an electromechanical connection. The micro-switches 90 can be encapsulated in a kapton layer to form a miniaturized switching electronics layer. The decal 88 can be coupled to a battery 72 and a processor 76. The decal 88 can be affixed to the PGA 84 using an adhesive layer 92 (e.g., by bonding PGA 89 to PGA 84). The adhesive layer 92 can be used to wire PGA 84 to the distribution of micro-switches 90.

The mechanical interconnects 91 can be, for example, hooks, loops, or mushrooms. A fraction of these mechanical interconnects 91 can be selectively metalized (e.g., by electroplating or by incorporating metallic studs) to introduce a distribution of electrical conductors according to a prescribed pattern and areal density that terminate on the PGA 89. The mechanical interconnects 91 can be connected to the micro-switches 90 encapsulated in the kapton layer and can terminate onto the PGA 89 on the back of the kapton layer.

In some embodiments, the adhesive layer 92 can be an Anisotropic Conducting Adhesive Film (ACAF). The ACAF can provide electrical conductivity across the two PGA distributions, while inhibiting conductivity in the lateral direction, preventing pad-to-pad shorting (e.g., for two connected AUTOCONNECT modules).

In some embodiments, the micro-switches 90 can switch the distributed mechanical interconnects 91 to a small number of function buses (e.g., serial data, power, analog signals), that are hardwired to the subsystem's 86 control electronics either via the PGA 84 or an internal, lightweight, pinned connector. Areal densities of a decal 88 can be much greater than the subsystem PGA, with the result that several external conductors are in contact with one electrical connection on the subsystem. This multiple redundancy provides AUTOCONNECT with a universal electrical connectivity property.

Figure 6:
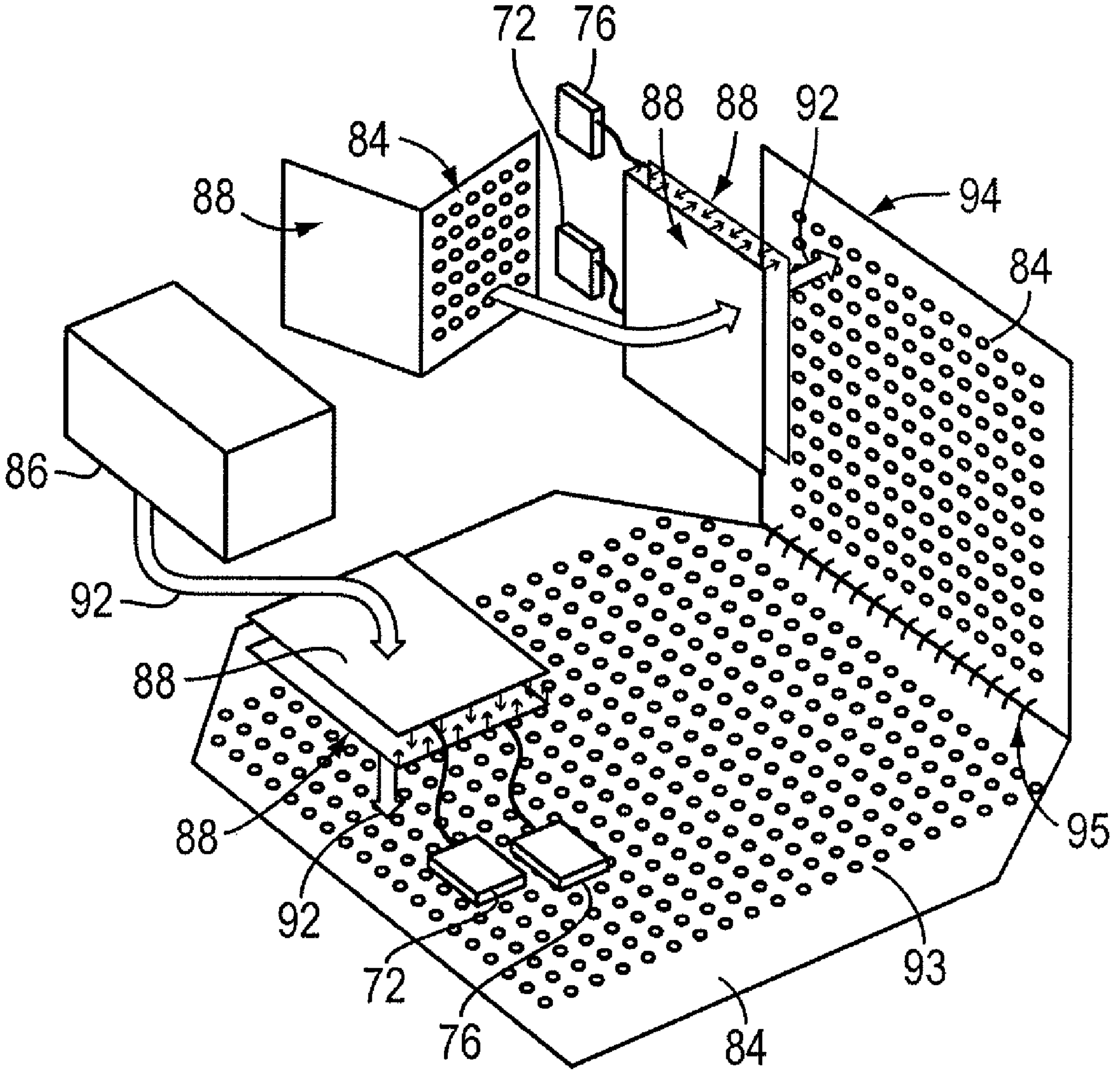
FIG. 6 shows subsystems attaching to a spacecraft.

FIG. 6 shows subsystems attaching to a spacecraft. A spacecraft deck 93 and a spacecraft side panel 94 can include PGA surfaces 84. Electromechanical connection decals 88 can be attached to the spacecraft deck 93 and the spacecraft side panel 94. The electromechanical connection decals 88 can be AUTOCONNECT decals. The electromechanical connection decals 88 can connect to the PGA surfaces 84 via a conductive adhesive layer 92. The spacecraft deck 93 and the spacecraft side panel 94 can be connected by a ribbon cable 95.

Each subsystem 86 includes a PGA surface 84 affixed to an electromechanical connection decal 88 by conductive adhesive layer 92. Each electromechanical connection decal 88 of a subsystem 86 can attach to an electromechanical connection decal 88 of the spacecraft (e.g., spacecraft deck 93 or spacecraft side panel 94). Subsystem 86 can be a flight computer or other spacecraft component.

Each electromechanical connection decal 88 of the spacecraft can be in communication with a processor 76 powered by a battery 72. The battery can ensure the processor 76 has power to assign connectors of the electromechanical connection decal 88. The battery 72 and a processor 76 can allow the processor 76 to retain information about the subsystem. For example, a miniature computer can contain information about the subsystems mass properties, position, orientation, pin requirements and/or contain a mating program.

Figure 7:
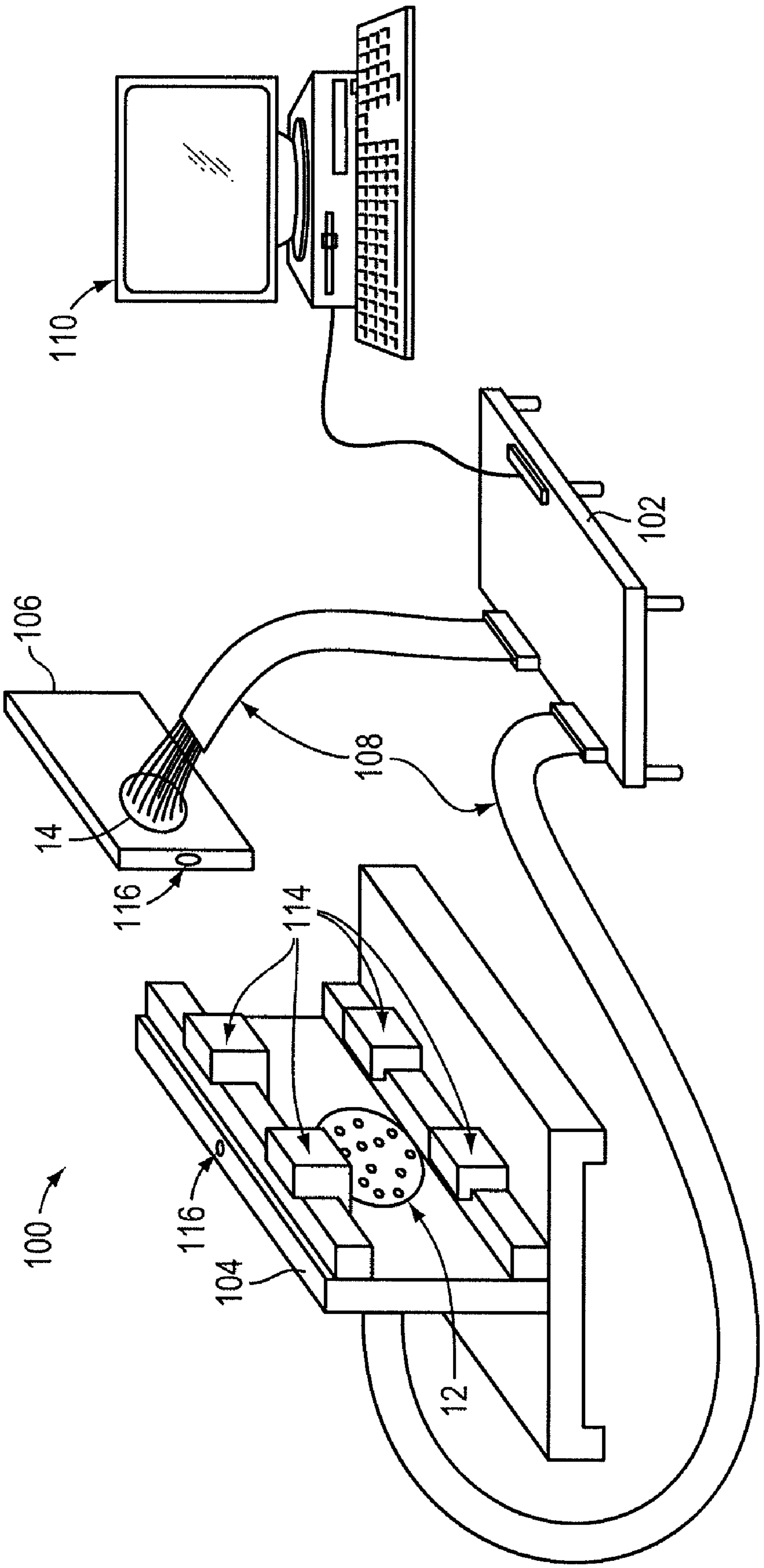
FIG. 7 shows a reconfigurable electromechanical connection interface breadboard simulator.

FIG. 7 shows a reconfigurable electromechanical interface breadboard simulator 100 that can permit arbitrary overlap orientations and variable overlap areas between two reconfigurable electromechanical interface substrates. The reconfigurable electromechanical interface breadboard simulator 100 hardware includes I/O board 102, a core module connector board 104, an attaching module connector board 106, one or more multi-connector ribbon cables 108, and a computer 110.

The core module connector board 104 includes four clamps 114 that allow the attaching module connector board 106 to physically connect to the core module connector board 104. The attaching module connector board 106 and the core module connector board 104 each have substrates, e.g., first substrate 12 and second substrate 14, which can permit electromechanical connections to be formed. The attaching module connector board 106 and the core module connector board 104 each include set screws 116 that allow the substrates 12 and 14 to slide past and rotate relative to each other to test various substrate orientations. The set screws 116 can allow for the substrates 12 and 14 to be clamped in any planar contact orientation with partial to full overlap. Ribbon cables 108 allow attachment of the core module connector board 104 and attaching module connector board 106 to the computer 110.

The substrates 12 and 14 can be two polycarbonate sheets into which various conductor distributions can be inserted.

For example, the substrates 12 and 14 can be 5 inch diameter polycarbonate disks. The set screws 116 can be nylon tipped set screws.

The I/O board 102 can be a Tern Inc. Model P300 expansion board. The I/O board 102 can be controlled by AE86 embedded microprocessor card. The computer 110 can be an AE86 controller. Together with the AE86 controller, the P300 expansion board can supply up to 264 channels of I/O appropriately buffered for transistor-to-transistor logic (TTL). The AE86 embedded microprocessor card can port an Advanced Micro Devices (AMD) 186 CPU, with 256 k of additional battery-backed 16-bit SRAM. The reconfigurable electromechanical interface breadboard simulator 100 algorithms can be written in Paradigm C/C++ code with an evaluation kit installed on a laptop computer, then subsequently downloaded into SRAM on the module emulators. The I/O channels can be configurable as input or output in blocks of eight. For example, one block was configured as input for the Pin Query function. The other 256 channels can be configured as outputs for addressing pin multiplexers. Additionally, each module emulator can have two free UARTs configured with RS232 drivers. One UART can be dedicated for data transfer between the programming computer and the module processor, whereas the AUTOCONNECT prototype connectivity algorithm can utilize the other UART to establish asynchronous serial communication between the modules.

Figure 8B:
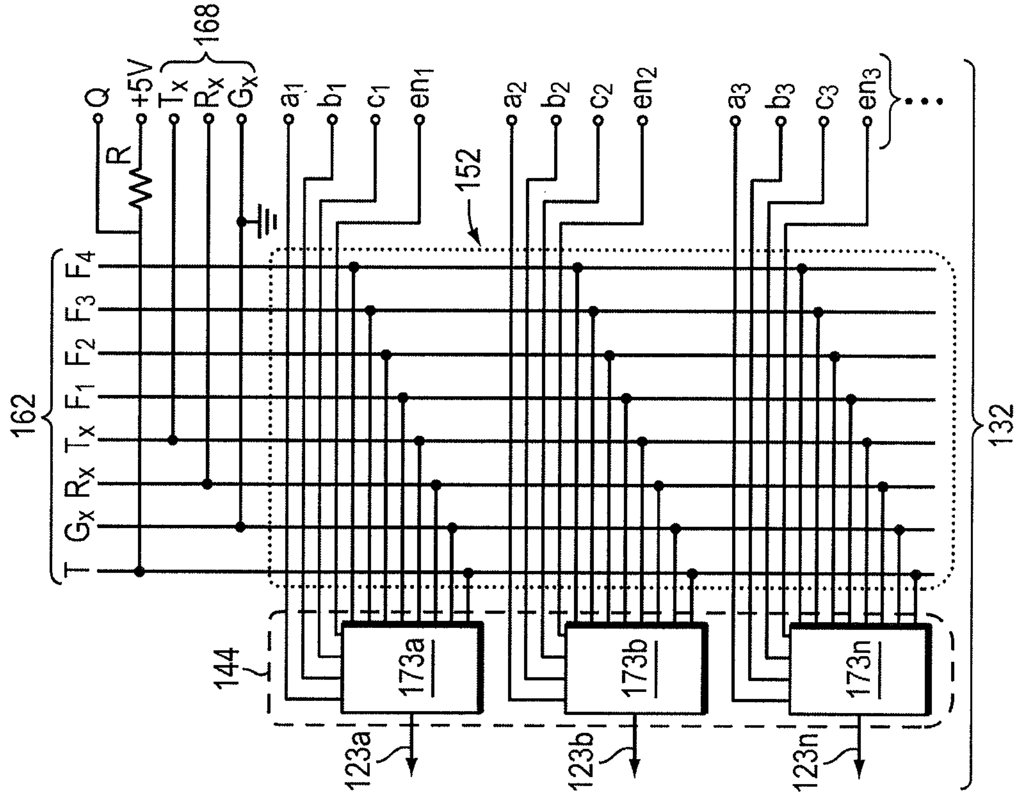
FIG. 8B is a schematic diagram of a switching circuit for an attaching module for a electromechanical interface.
Figure 8A:
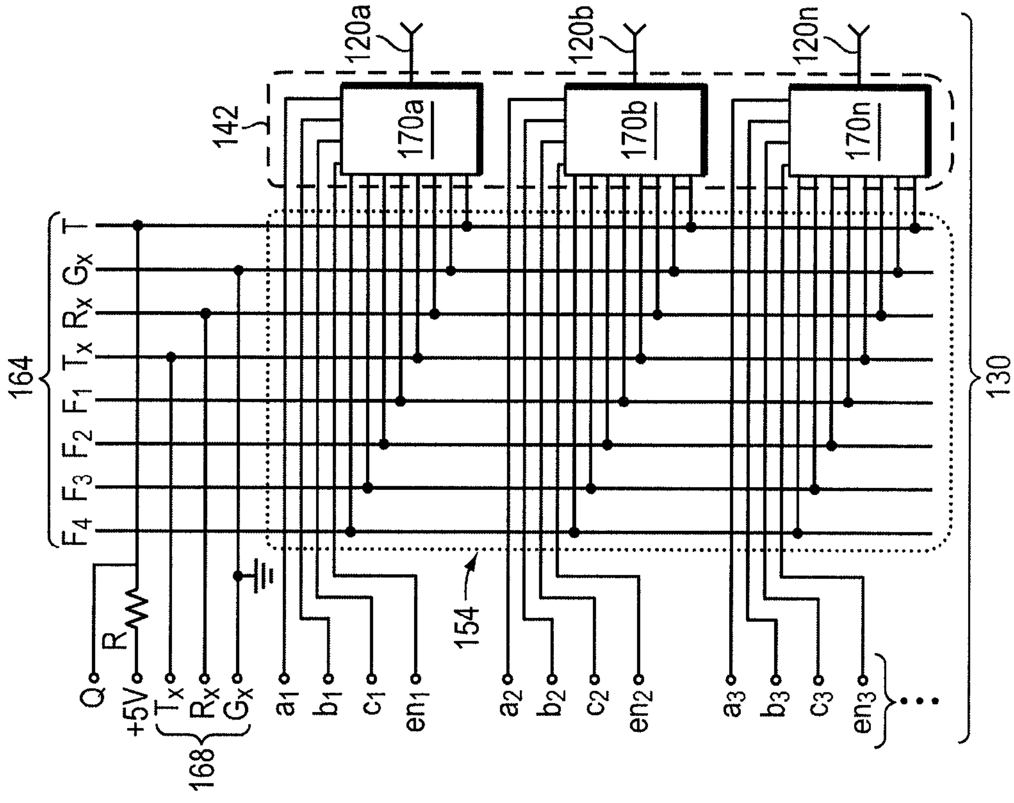
FIG. 8A is a schematic diagram of a switching circuit for a core module for a electromechanical interface.

FIG. 8A is a schematic diagram of a switching circuit for a core module (CM) 130 for an electromechanical interface. FIG. 8B is a schematic diagram of a switching circuit for an attaching module (AM) 132 for an electromechanical interface. Three layers of electronics can be used to map an arbitrary distribution of overlapping conductors. Conductive metalized regions 20 are generally represented on the CM 130 as electrical contacts or pins, 120*a*, 120*b* . . . 120*n* (generally, 120). Conductive metalized regions 20 are generally represented on the AM 132 as electrical contacts or pins, 123*a*, 123*b* . . . 123*n* (generally, 123).

The first layer can include the conductive regions, e.g., pins 120 and 123. The second layer includes a relay or switch array 142 of the CM 130 and 144 of the AM 132, which permit connection between the pins 120 and 123 and the functional buses 164 and 168 of the CM 130 and 162 and 166 of the AM 132. The third layer includes the multiplexing circuitry 170*a*, 170*b* . . . 170*n* (generally, 170), of the CM 130 and 173*a*, 173*b* . . . 173*n* (generally, 173) of the AM 132. The multiplexing circuitry 170 and 173 permit selection of connectivity between pins 120 and 123 and buses 162 and 164. The second and third layers can be logical code layers, and need not be physical layers.

TABLE 1

Design parameters for circuit layers

| Layer 1 (pins) | Layer 2 (Relays) | Layer 3 (Decoders) |
|---|---|---|
| Total number | Total number | Total number |
| Number per relay | Required number of bus lines | Required number of bus lines |
| Pattern of arrangement | Power requirements | Size and shape |
| Packing density | Impedance | Chip architecture |
| Size and shape | Thermal management | |
| Attachment mechanism | Size and shape | |
| Conductor overlap | | |
| Shielding | | |

Table 1 lists design parameters for each circuit layer. The required number of function buses, Nb, is application-specific. The minimum number of pins required to make an electrical connection between a mated CM 130 and AM 132 is a function of the required number of function buses, Nb.

Pin redundancy can be used for any Layer 1 architecture in which non- or intermittent contacts can occur between the module connectors. Such redundancy can be achieved by having an excess of conductive regions, Np>Nb, each with its own array of Nb switches, in sufficient quantity so that at least Nb good contacts can be assured. In some embodiments, subsets or "traces" of the Np pins can be connected into a single channel on the same switch array, with as few as Nb channels to support the Nb buses. The total number of switches in an array can be Nb times Np. The combination of pins in traces reduces the total number of interface components, with resultant savings in infrastructural complexity, size, and weight, as well as material and energy costs. Such a strategy can introduce the risk of multiple trace overlaps or "daisy chains" across the module interface, with a resulting reduction in the number of independent channels. In various embodiments, each electrical connection can be switched independently of every other pin, in order to circumvent the multiple trace overlap problem altogether. In certain embodiments, pin arrangement can be used so that multiple electrical connections can be controlled by a switch.

The functional Test bus (T) on the CM 130 and/or the AM 132 can be used to recognize initial contact between the CM 130 and AM 132 and the Transmit ($T_x$), and Receive ($R_x$) buses, which can be used to initiate communication between the CM 130 and AM 132. After the CM 130 and the AM 132 detect initial contact, a pre-programmed choreographed sequence of steps can be used to set the stage for communication between the CM 130 and the AM 132. A pin-for-pin connectivity map can be determined to show good contacts between the CM 130 and AM 132. Instructions can be sent between the CM 130 and the AM 132 to establish a correct interconnection of function buses 162, 164, 166, and 168 and serial communication. The functional bus pins F1, F2, F3, and F4 can be used for power signals, clock signals, data signals and/or other signal lines once connectivity between the CM 130 and AM 132 is achieved. The G functional bus pin can be employed for grounding requirements between the CM 130 and AM 132 in a connected configuration.

To recognize initial contact between the CM 130 and the AM 132, all of the pins 120 and 123 are set to a common reference potential (e.g., ground) by switching the G functional bus into the multiplexed circuitry 170 and 173. Then, for example, for the AM 132 to determine good contacts with the CM 130, the Test bus (T) on the AM 132 can be connected to a series resistor R, a query logic input (Q) reference, a power supply and the multiplexed circuitry 173. The Test bus (T) can be switched into the multiplexed circuitry 173. If the AM 132 is connected to the CM 130, then switching the Test bus (T) into one of multiplexed circuitry 173 results in a closed circuit for the Test bus (T).

If the AM 132 is not connected to the CM 130, then switching the Test bus (T) into one of multiplexed circuitry 173 results in an open circuit. Detecting the open or closed circuit for the Test bus (T) determines whether or not a connection between the AM 132 and the CM 130 has been made. For example, the power supply can be a +5 V voltage regulator powered from a +15 V mux power supply rail (not shown). The series resistor can be a 3.9Ω series resistor. It follows that when query logic input (Q) has a value of +5 V (transistor to transistor logical high), the Test bus (T) circuit is open indicating no contact between the CM 130 and the AM 132. When query logic input (Q) has a value of several hundred mV (transistor to transistor logical low), the Test bus (T) circuit is closed indicating a contact between the CM 130 and the AM

132. It is noted that the exact number of mV for a transistor to transistor logical low is determined by the net ON resistance of the multiplexed circuitry 170 and 173 used in the CM 130 and the AM 132.

The Test bus (T) circuit effectively detects a current loop from one module pin, through pins on the other module, and back to ground through another pin on the first module. The query logic input (Q) can be queried for a resistance value to detect a transistor to transistor high or low when the query logic input (Q) is positioned at a reference point immediately after the series resistor on the Test bus (T). For example, whenever the Test circuit is “shorted,” the resistance is less than or equal to 740 Ohms. Whenever the Test circuit is “open” the resistance is greater than or equal to 2.6 Ohms. The CM 130 can detect contact with the AM 132.

The CM 130 and the AM 132 can be identical circuits, or they can be different circuits. For example, the switching array in the CM 130 can be multiplexers and the switching array in the AM can be a PGA.

The CM 130 and AM 132 can test for good electrical connections after the establishment of a mechanical connection. To avoid a false query result at Q due to the simultaneous assertion of the Test bus (T) by the CM 130 and the AM 132 on interconnected pins 120 and 123, the query logic input (Q) can be queried twice during a predetermined dwell time for a particular pin configuration. The dwell time can be set differently for the CM 130 and AM 132 to ensure that the two queries cannot both overlap at the two query instances.

After a good connection is established, a processor included with the CM 130 communicates the CM’s pin requirements to the AM 132 and a processor included with the AM communicates the AM’s pin requirements to the CM 130. Once the pin requirements are established, the CM’s processor and the AM’s processor can determine which functions can be appropriately placed on which pins. For example, some pins can be capable of only holding ground; other pins may be capable of holding power and ground, while still other pins may be capable of holding any signal. The CM’s processor and the AM’s processor can then assign function to specific pins.

Although timing can be important for the choreography of steps leading to establishment of a serial communication between modules, the connection can work asynchronously for modem microprocessors that have identical clock rates that are within manufacturing tolerances. A clocking signal cannot be sent through the arbitrary pattern of interconnections and interpreted correctly until the modules have worked out the pin mapping. Since contact recognition is generally not simultaneous for two modules, the first LOW query results can be synchronized to an accuracy of one test circuit cycle through all of the connector pins. The algorithm can rely on the strategy of overlapping timeout periods to overcome this initial temporal uncertainty.

Figure 9B:
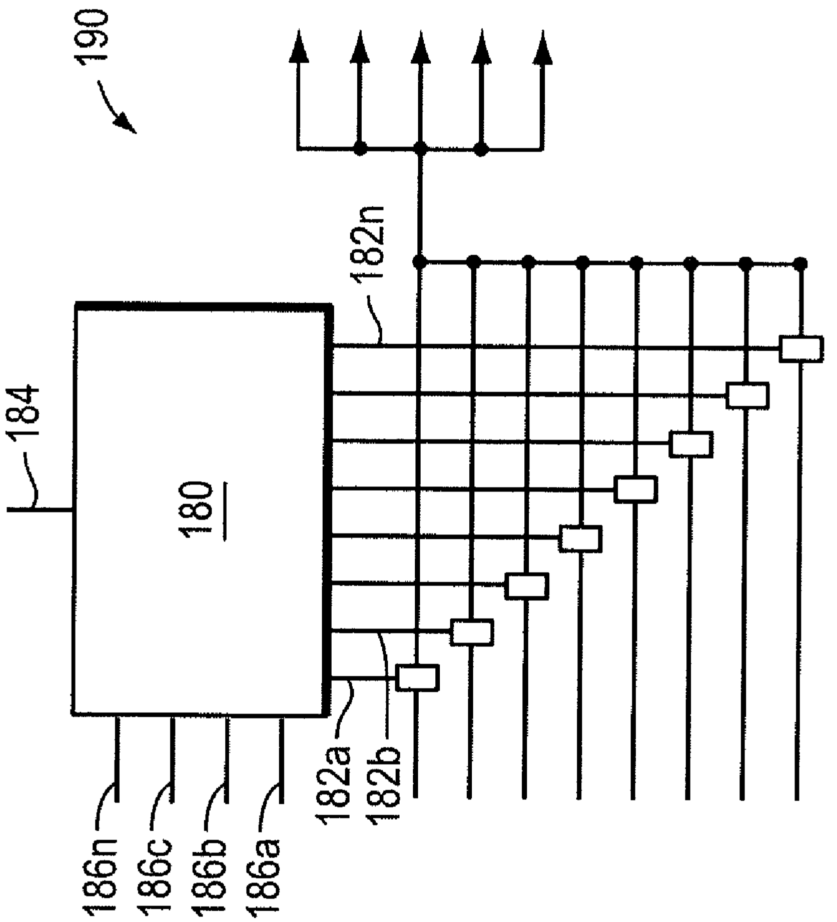
FIG. 9B is a schematic diagram of a switching element for a reconfigurable electromechanical interface switching array.
Figure 9A:
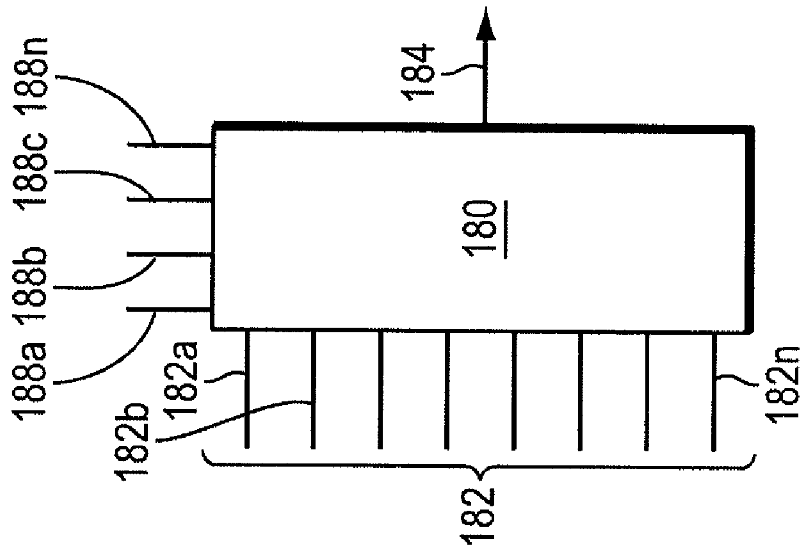
FIG. 9A is a schematic diagram of a switching element that can be used with a reconfigurable electromechanical interface switching array.

FIG. 9A illustrates a switching element that can be used with the reconfigurable electromechanical interface switching array, e.g., 170. An 8 to 1 multiplexer 180 can permit any of eight buses, 182*a*, 182*b* . . . 182*h*, to be switched into a single pin 184 with binary address lines 186*a*, 186*b*, and 186*c* and enable (EN) lines 188.

FIG. 9B shows how the same 8 to 1 multiplexer 180 can be used as a decoder in a functional circuit 190 yielding a higher capacity switching element. For functional circuit 190, the 8 to 1 multiplexer 180 can be replaced with other logic elements, for example, cross point switches constructed from complex programmable logic devices (CPLDs). The configuration of the 8 to 1 multiplexer 180 as shown in FIG. 9B combines the switching and decoding functions of Layers 2 and 3 (discussed above in Table 1), while maintaining the advantages of being a simple, low-cost implementation. The functional circuit 190 can be selected on the basis of convenient packaging and availability. For example, Analog Devices ADG408BN part is a CMOS 8 to 1 mux with a plastic dual inline (PDIP) package having four control lines (e.g., 186*a*, 186*b*, 186*c* and 188) per chip and 256 output channels.

A particular switching array configuration can be determined by a particular application or a particular bus used. For example, analog multiplexers can be used for low-power applications with a VI product of −0.5 W or less. For applications exceeding commercially available mux specifications, other logic-controllable switching elements, such as Reed relays or MOSFET switches, can be employed. Additional capacity can be facilitated with analog multiplexers by specifying a minimum number of parallel pin connections for the high-power buses.

The multiplexing circuitry 180 can be multiplexers having a higher multiplexing capacity (e.g., 16:1 or 32:1). Multiplexers with a higher multiplexing capacity can provide a greater numbers of free buses, as indicated by Table 2.

TABLE 2

AUTOCONNECT Free Buses Supported and Maximum Number of Decoders per Expansion Board as Functions of Multiplexing Capacity.

| Multiplexer | Number of Free Buses | Maximum Number of Decoders |
|---|---|---|
| 8:1 | 4 | 64 |
| 16:1 | 12 | 51 |
| 32:1 | 28 | 42 |

Figure 10A:
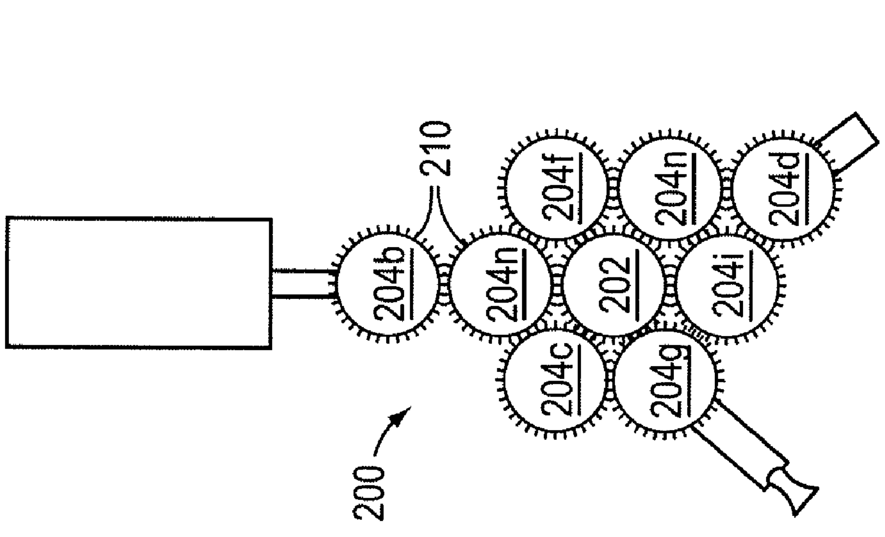
FIG. 10A is a sectional view of a spacecraft with modules joined by reconfigurable electromechanical connection interfaces.
Figure 10B:
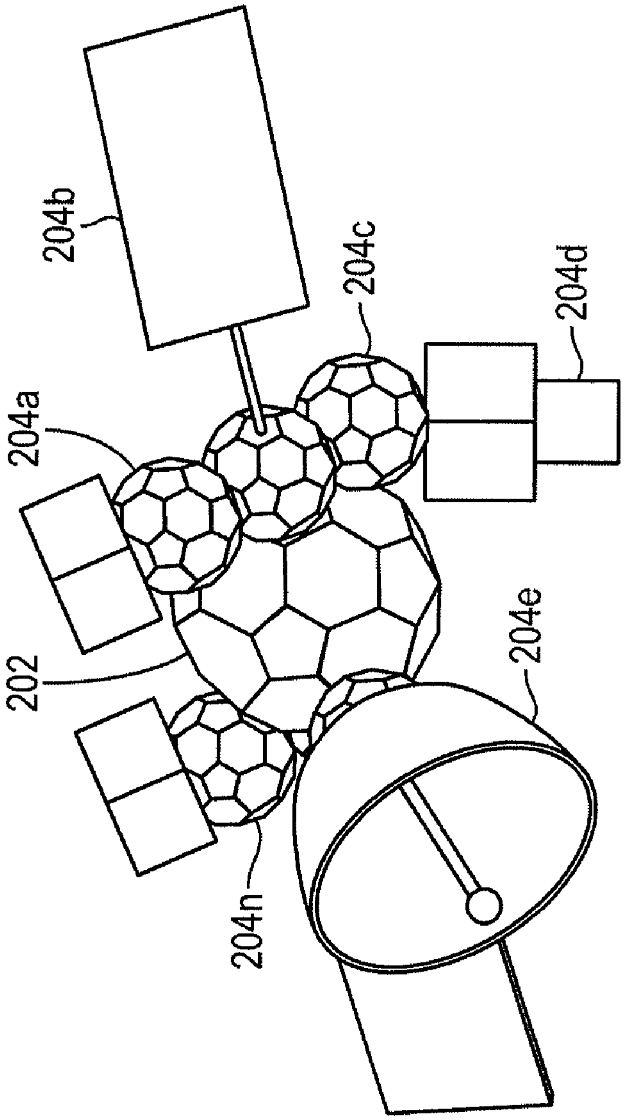
FIG. 10B is a perspective view of a spacecraft with modules joined by reconfigurable electromechanical connection interfaces.

A reconfigurable electromechanical interface can be used in a spacecraft design. The spacecraft design can include a collection of modules with one module designated as a “core” (CM) and the remaining modules designated as “attaching” modules (AM) (e.g., subsystems and/or payload modules). FIG. 10 shows an example of an AUTOCONNECT connected spacecraft 200 design. The spacecraft 200 includes a CM 202 and multiple AMs: a power control module 204*a*, a solar array 204*b*, an array drive module 204*c*, a camera 204*d*, an antenna 204*e*, a reaction wheel 204*f*, a thruster 204*g*, a data storage 204*h*, a sensor 204*i*, and a battery module 204*n* (generally, 204).

All or a portion of each CM 202 and AM 204 surface can be covered with an electromechanical connection surface 210. The spacecraft 200 can be assembled in orbit. For example, CM 202 can be launched into orbit or a spacecraft already placed in orbit can act as the CM 202. A servicer spacecraft or spacecraft facility (not shown) can deliver each AM 204 to a target module (e.g., CM 202 or another AM 204). The AM 204 can be launched from the servicer spacecraft at a low velocity and with little or no regard to spatial orientation or alignment relative to the target module. The AM 204 can approach the target module, and the electromechanical connection surfaces 210 of the AM 204 and the target module can attach.

The target module can be another AM 204 module. For example, the camera 204*d* can connect to the array drive module 204*c*. In this case, the electromechanical connection surface 210 can enable communication of the camera 204*d* with the CM 202 even though the array drive module 204*c* is between the camera 204*d* and the CM 202. Any AM 204 that attaches to any other AM 204 that is attached to the CM 202 can establish communication with the CM 202. A CM 202 processor can command the AM 204 through the interface of electromechanical connection surfaces 210, established for communication. For example, the CM 202 processor can command the spacecraft 200 to execute certain maneuvers, e.g., firing thrusters 204*g*, producing dynamic data from gyros and accelerometers on board the CM 202 to determine the center of mass and moments of inertia of the spacecraft 200. The CM 202 processor (or on another module, e.g., AM 204) can modify its attitude control algorithm to ensure that the spacecraft 200 maintains a stable spatial orientation. Alternatively, a processor on the AM 204 can communicate its mass, size, and spatial characteristics (e.g., location of the AM 204 relative to the CM 202 or another AM 204) to the CM 202 so that the spacecraft's orbit can be adjusted.

AUTOCONNECT offers several advantages at the spacecraft system level compared to the current docking and attachment mechanisms. Current docking systems require precise alignment, positioning, and near-zero translational and rotational rates. This requires a complex suite of sensors, latching and electrical connection mechanisms, and expenditure of precious fuel. AUTOCONNECT does not require as precise maneuvers, complex mechanisms, and electrical connections, although they can be used. With AUTOCONNECT, special proximity operations are not needed; docking is accomplished simply by lobbing modules toward the core spacecraft from the servicer spacecraft. AUTOCONNECT also provides a lightweight, compact system by avoiding the need for complex docking/hardware.

When used for on-orbit assembly of space systems, AUTOCONNECT requires sufficient relative velocity (relative initial momentum) between attaching modules so that a strong mechanical connection is achieved by the hook-and-loop fasteners. This method of docking can result in disturbance forces and torques on the modules, and damping mechanisms can be used, aside from AUTOCONNECT's intrinsic damping capabilities.

A spacecraft can exhibit a distributed architecture. For example, each module can be autonomous, incorporating processor(s), selected motion sensors and, if necessary, contain actuators, and some basic "spacecraft-like" subsystems of their own. The module can possess sufficient intelligence, including AUTOCONNECT interface software, to communicate with other modules, exchange data, and/or process its own onboard sensor data. Each module can provide its own thermal control independent of other modules. Each module can use an attitude control system, such as magnetic torquers or momentum wheels, that can be used in conjunction with other modules for controlling attitude and/or orbit of the spacecraft assembly.

Each module can include a low overhead wireless communications capability. Prior to modules connecting, modules can communicate so that a CM can receive an authentication notification of the intent to add modules to a spacecraft. The authentication process can provide a means of security to prevent possible connections by unauthorized and/or adversarial modules. Communication before module connection can also coordinate activities. For example, an unconnected module can query a spacecraft for slewing data to avoid attempting to connect to the spacecraft while the spacecraft is in the middle of a slewing. For another example, an unconnected module can avoid connecting while the spacecraft is in the middle of a data collection operation that is sensitive to electrical and/or mechanical disturbances. Communication before module connection can also allow for the unattached module to receive from the spacecraft a velocity vector and orientation so that the unattached module can determine necessary maneuvers to maximize its position when connecting and/or determine damping of impact forces.

Figure 11:
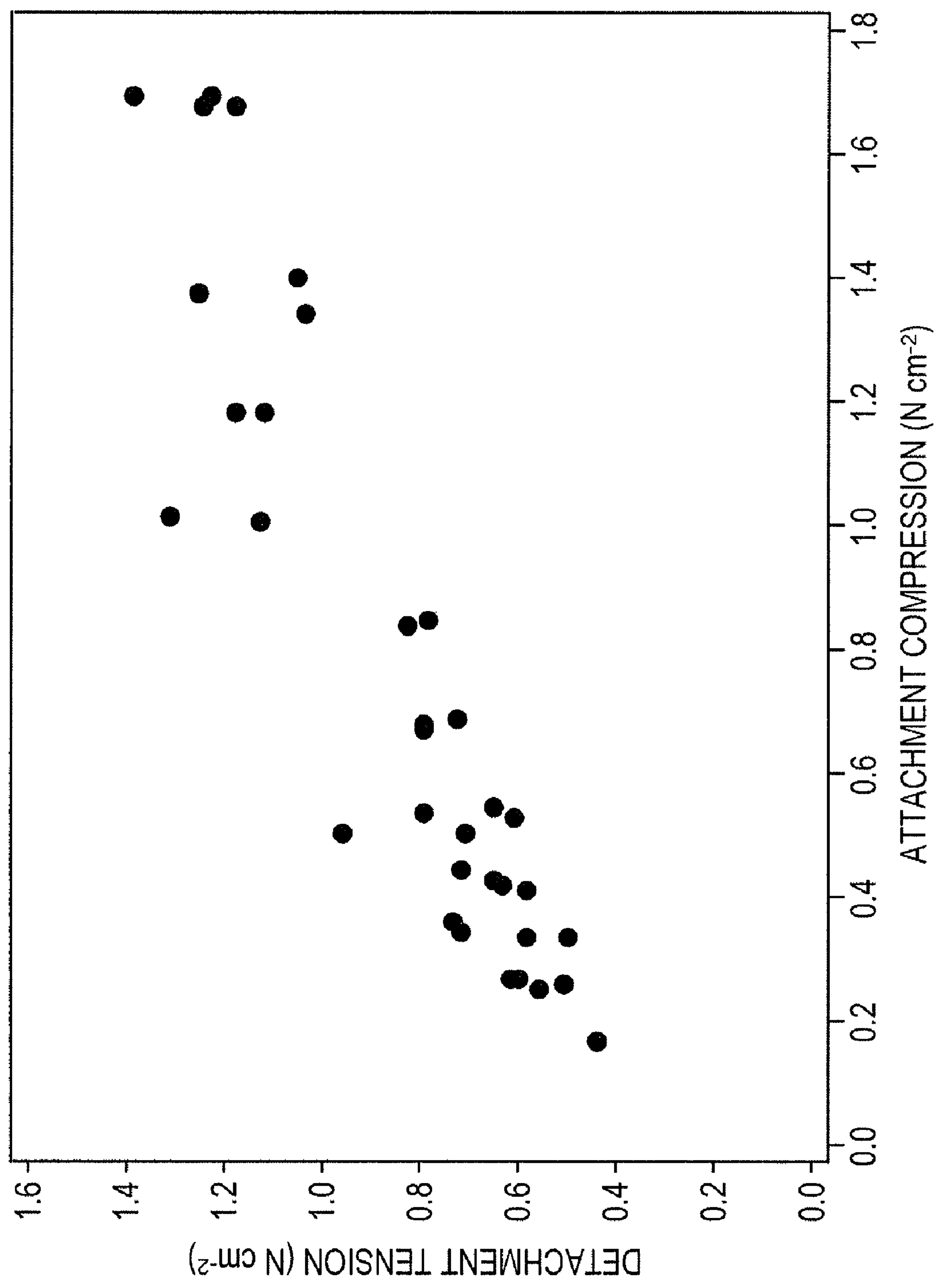
FIG. 11 is a plot of attachment force versus detachment force for an exemplary hook-and-loop type reconfigurable electromechanical connector.

FIG. 11 is a plot of attachment force versus detachment force for an exemplary hook-and-loop type reconfigurable electromechanical connector for AUTOCONNECT during a static attachment. A module covered with hooks (or loops) was pressed against a static surface covered with loops (or hooks). The force of attachment was measured using a gauge. Following the attachment, the module was pulled away and the detachment force was measured using the same gauge in-line. The detachment force rises rapidly even for small values of the attachment force. For example, as the attachment force increases from zero to 0.2 N/cm$^2$, the detachment force increases linearly from 0 to >0.4 N/cm$^2$. For an attachment of >0.2 N/cm$^2$, the detachment force increases nonlinearly with the attachment force, tending to asymptote to a value. Typical on-orbit forces can be less than 0.1 N, thus 10 cm$^2$ of hook-and-loop area can be used.

Figure 12:
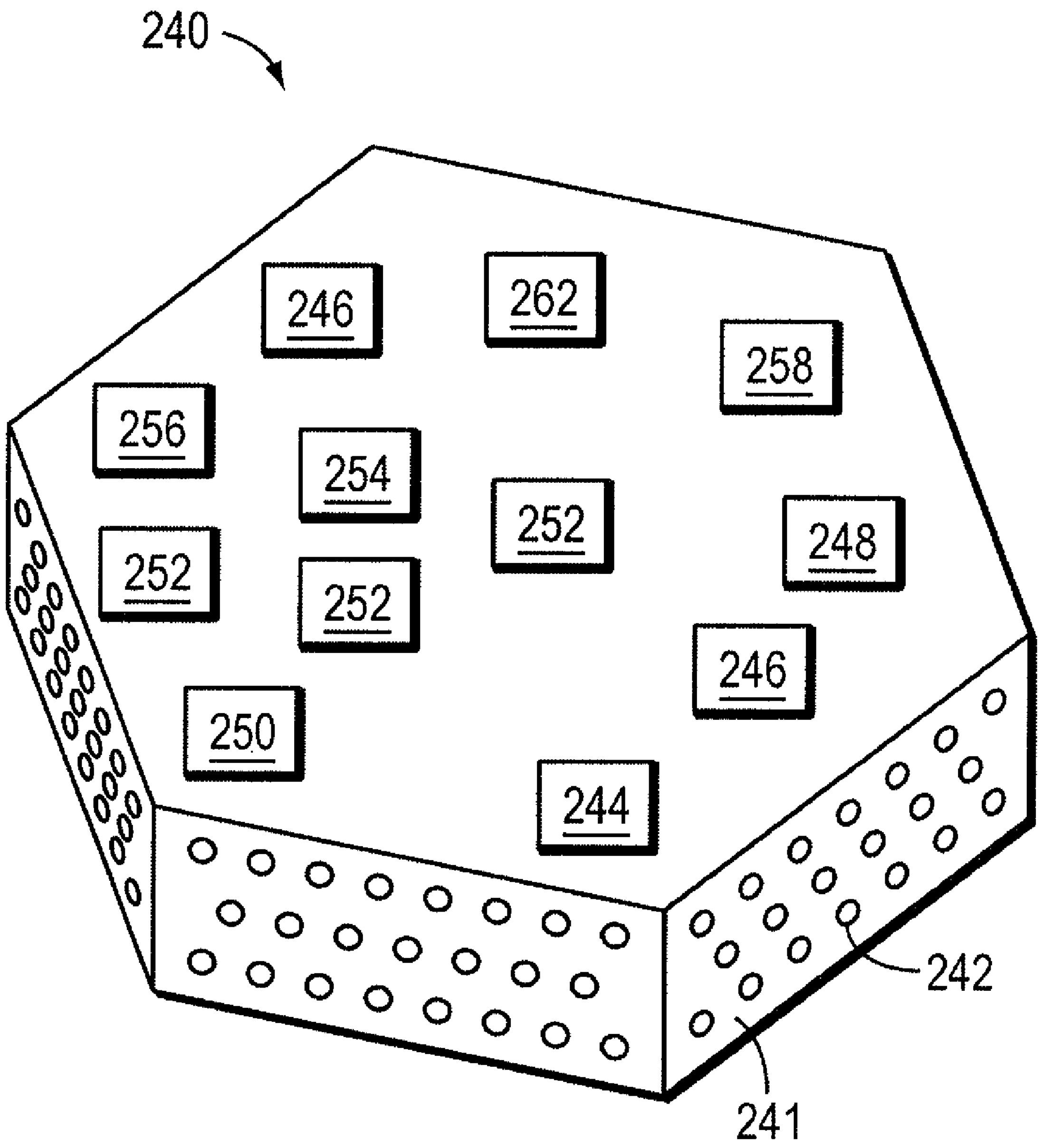
FIG. 12 shows an embodiment of a spacecraft simulation module with reconfigurable electromechanical connection interface substrates.

FIG. 12 shows an embodiment of a module 240 including an electromechanical connection (e.g., AUTOCONNECT) that can simulate spacecraft operation in two dimensions, e.g., an X-Y plane. The module 240 can have a 20 cm hexagonal shape. The module 240 can weigh approximately 1.5 kg. The module 240 includes multiple connection panels 241 (e.g., including AUTOCONNECT hook and loop type connectors), a distribution of conducting pads 242, a voltage regulator 244, batteries 246, a fan motor 248, a fan inlet 250, motion sensors 252, a controller 254, a router 256, a module controller 258, and a reaction wheel 262.

The distribution of conducting pads 242 can be formed by electroplating selected areas of the connection panel 241 fasteners with a conducting material, e.g., gold.

The module controller 258 can control motion of the module 240. The fan motor 248 and fan inlet 250 produce air on which the module 240 can hover resulting in frictionless motion when the reaction wheel 262 rotates. The reaction wheel 262 is driven by the module controller 258. The module controller 258 can acquire motion sensor 252 inputs through, for example, a set of 12-bit A/D converters and generate a torque command to the reaction wheel 262 from a 12-bit D/A. The motion sensors 252 can include rate gyros, angular accelerometers, and two-axis linear accelerometers operating in the plane of motion. The module 240 can hover on an air cushion at approximately 250 microns height above a surface, e.g., a table.

The controller 254 controls connection to and communication with another module. The router 256 controls communication between the controller 254 and the module controller 258.

Figure 13:
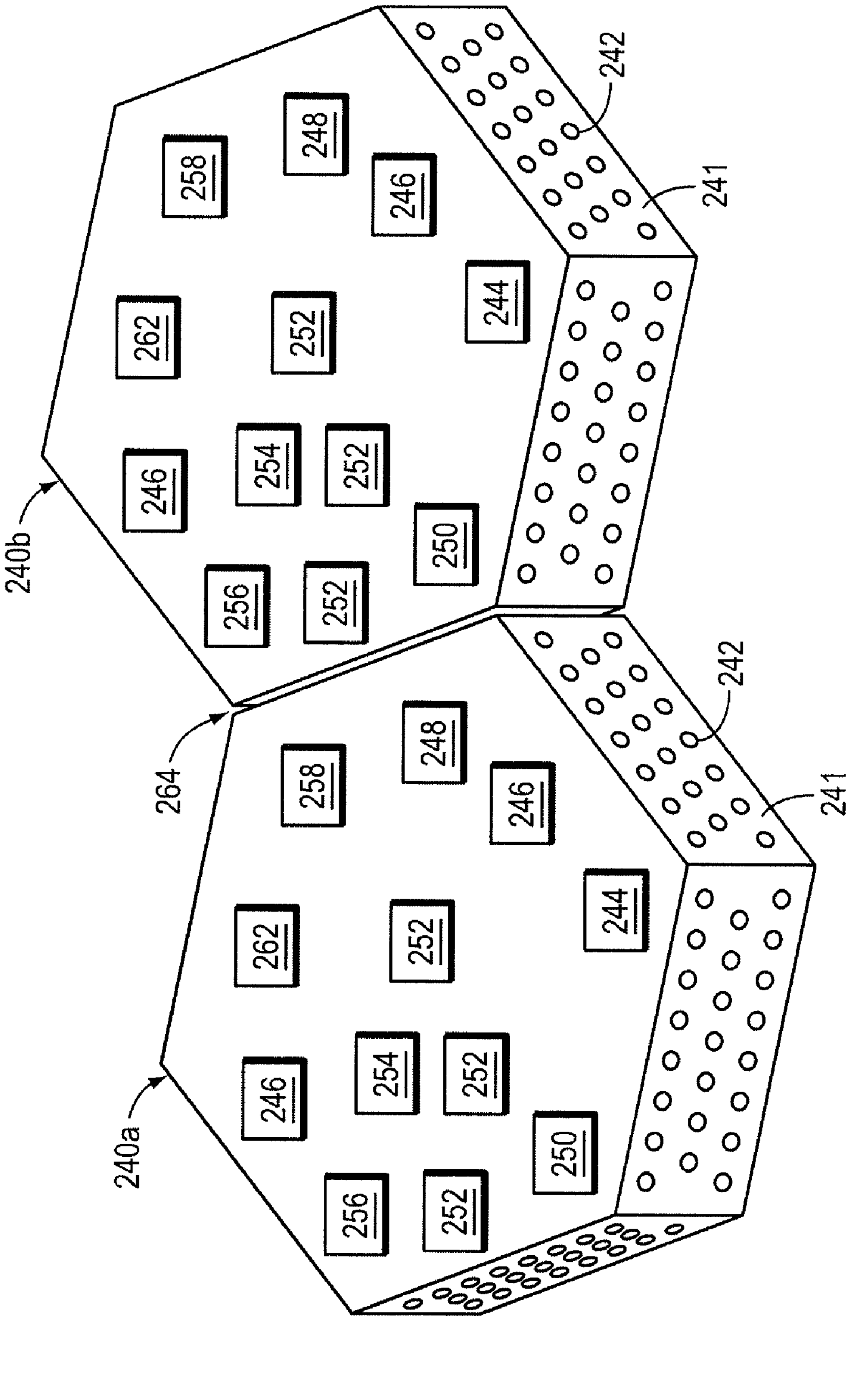
FIG. 13 shows two spacecraft simulation modules joined by electromechanical connections.

To simulate on-orbit docking, the attachment of two modules, e.g., module 240, can be achieved dynamically by launching the disks toward each other at a small relative velocity on a table top. FIG. 13 shows an example of two spacecraft simulation modules docked. Each module 240*a* and 240*b* can control its own motion with data and power transmitted between the modules across the connection interface 264, e.g., an AUTOCONNECT hook and loop type panel.

The dynamic attachment and detachment forces between the two spacecraft simulation modules were calculated. The attachment force was calculated from accelerations measured by linear accelerometers on-board the two modules during the process of dynamic attachment. Dynamic attachment was achieved by launching a first module towards a second stationary module. Corresponding attachment force data derived from the two accelerometers indicated attachment forces of approximately 30 N or 0.5 N/cm$^2$ corresponding to initial linear momentum of 0.75 N s for the launched module. The corresponding detachment force is 0.6 N/$cm^2$, ~40 N.

The transmission of serial data across the connection panel interface 264 was experimentally demonstrated by attaching light emitting diodes to switching arrays, one attached to each module, to confirm transmission and receipt of digital data. The two modules established an initial connection and established communication by, for example, the method described above in connection with FIG. 11, to identify two conductors for transmission. Once communication was established, the letter "A" was transmitted from the first module (e.g., CM 130) to the second module (e.g., AM 132). The second module responded by transmitting the letter "U" to the first module. The first module and the second module lighted a green LED on a multiplexer board upon receiving the designated letter. The passage of current between the first module and the second module was measured, for example, by measuring the transmission of power between overlapping conductors between the two attached modules. For two overlapping, gold plated, hook-and-loop surfaces, measuring 0.7 $cm^2$ each, 1 amp of current with a voltage drop of 0.2 V was transmitted. Thus, for a 28 V power bus, a single pad can provide 28 W transmission with 200 mW loss at the hook-and-loop surface junction. When using multiple, redundant conductive contacts between two AUTOCONNECT-covered surfaces, a power of 50 to 100 W can be transmitted.

While the invention has been particularly shown and described with reference to specific embodiments, it should be understood by those skilled in the art that various changes in form and detail may be made therein without departing from the spirit and scope of the invention as defined by the appended claims.

What is claimed is:

1. A method of forming an electromechanical connection, comprising:

providing a first plurality of conductors disposed in a first non-conductive array, each conductor electrically insulated from an adjacent conductor of the first plurality of conductors;

providing a second plurality of conductors disposed in a second non-conductive array, each conductor electrically insulated from an adjacent conductor of the second plurality of conductors;

engaging the first non-conductive array and the second non-conductive array to form a plurality of discrete electrical connections between at least a portion of the first plurality of conductors and at least a portion of the second plurality of conductors, each discrete electrical connection being formed by a single conductor of the first plurality of conductors and a single conductor of the second plurality of conductors;

determining the number of discrete electrical connections formed; and assigning one or more of the discrete electrical connections to serve a function.

2. The method of claim 1 wherein each conductor of the first plurality of conductors is associated with a switch connecting the conductor to a plurality of channels, each channel of each switch being associated with a predetermined function of a set of predetermined functions, the function being one of the set of predetermined functions.

3. The method of claim 2 further comprising selecting a discrete electrical connection and triggering the switch associated with the conductor of the first plurality of conductors to form a path for electrical communication between the conductor and a source of the predetermined function.

4. The method of claim 2 further comprising cycling the switches associated with the first plurality of conductors to identify the number of discrete electrical connections formed.

5. The method of claim 4 further comprising assigning a portion of the discrete electrical connections to serve one of the predetermined functions of the set of predetermined functions.

6. The method of claim 2 wherein a module associated with the second non-conductive array communicates to a processor associated with the first non-conductive array requirements for each predetermined function of the set of predetermined functions.

7. The method of claim 6 further comprising assigning to each predetermined function a portion of the discrete electrical connections, no discrete electrical connection serving more than one function.

8. The method of claim 1 further comprising assembling a spacecraft in orbit, the spacecraft including one or more electromechanical connections.

9. The method of claim 1 wherein all elements of the non-conductive arrays and all conductors of the plurality of conductors provide mechanical connection after engagement of the first non-conductive array and the second non-conductive array.

10. An electromechanical connection comprising:

a first conductor disposed in a first non-conductive array;

a second conductor disposed in a second non-conductive array capable of mating with the first non-conductive array, the second conductor capable of mating with the first conductor when the first non-conductive array and the second non-conductive array are mated; and a processor associated with the first non-conductive array determining if an electrical connection is formed between the first conductor and the second conductor by mating the first non-conductive array and the second non-conductive array, the processor assigning a function to the electrical connection.

11. The electromechanical connection of claim 10 further comprising a switch comprising a plurality of channels, the switch in electrical communication with the first conductor, each channel of the switch being associated with a predetermined function of a set of predetermined functions, the function being one of the set of predetermined functions.

12. The electromechanical connection of claim 11 wherein the processor triggers the switch to form a path for electrical communication between the electrical connection and a source of the function.

13. A substrate for forming an electromechanical connection, comprising:

a conductor disposed in an array of non-conductors;

a switch in electrical communication with the conductor, each channel of the switch associated with a predetermined function; and a processor for determining if the conductor has formed an electrical connection and assigning a predetermined function to the electrical connection, the processor triggering the switch to form a path for electrical communication between the conductor and a source of the predetermined function.

14. The substrate of claim 13 wherein each non-conductor comprises a hook type connector of a hook and loop connection system.

15. The substrate of claim 13 wherein each non-conductor comprises a loop type connector of a hook and loop connection system.

16. The substrate of claim 13 wherein each non-conductor comprises a mushroom type connector of a dual lock mushroom connection system.

17. The substrate of claim 13 wherein the conductor is formed by metallizing a hook type connector of a hook and loop connection system.

18. The substrate of claim 13 wherein the conductor is formed by metallizing a loop type connector of a hook and loop connection system.

19. The substrate of claim 13 wherein the conductor is formed by metallizing a mushroom type connector of a dual lock mushroom connection system.

20. The substrate of claim 13 wherein the conductor includes a plurality of embedded discrete electrically conducting components.

21. The substrate of claim 20 wherein the discrete electrically conducting components are at least one of pins or metallic studs.

22. An electromechanical connection comprising:

a first plurality of conductors disposed in a first non-conductive array, each conductor electrically insulated from an adjacent conductor of the first plurality of conductors;

a second plurality of conductors disposed in a second non-conductive array capable of mating with the first non-conductive array, each conductor electrically insulated from an adjacent conductor of the second plurality of conductors, the second plurality of conductors capable of mating with the first plurality of conductors to form a plurality of electrical connections when the first non-conductive array and the second non-conductive array are mated; and a processor associated with the first non-conductive array determining the number of electrical connections formed and assigning one or more of the electrical connections to serve a predetermined function.

23. The electromechanical connection of claim 22 further comprising a module associated with the second non-conductive array communicating to the processor associated with the first non-conductive array requirements for each predetermined function of a set of predetermined functions.

24. The electromechanical connection of claim 23 wherein the processor assigns each predetermined function a portion of the discrete electrical connections, no discrete electrical connection serving more than one function.

25. The electromechanical connection of claim 23 wherein the processor assigns a plurality of electrical connections to serve one of the predetermined functions of the set of predetermined functions.

26. The electromechanical connection of claim 22 further comprising a second processor associated with the second non-conductive array, the second processor determining assigning one or more of the electrical connections to serve a predetermined function.

* * * * *

UNITED STATES PATENT AND TRADEMARK OFFICE

CERTIFICATE OF CORRECTION

PATENT NO. : 7,763,995 B2
APPLICATION NO. : 12/053263
DATED : July 27, 2010
INVENTOR(S) : Joshi et al.

It is certified that error appears in the above-identified patent and that said Letters Patent is hereby corrected as shown below:

In the Specification

In Column 1 under GOVERNMENT RIGHTS starting with line 16:

Delete:

"This invention was made with Government support under contract number NNM05AA12C. The federal government may have rights in the invention."

Replace with:

"This invention was made with Government support under contract number NNM05AA12C awarded by the National Aeronautics and Space Administration and contract no. DAAH01-03-C-R076 awarded by the U.S. Army. The Government has certain rights in the invention."

Signed and Sealed this
Sixteenth Day of September, 2014

Michelle K. Lee

Michelle K. Lee
*Deputy Director of the United States Patent and Trademark Office*